(12) United States Patent
Belcher (10) Patent No.: US 12,179,442 B2
(45) Date of Patent: Dec. 31, 2024

(54) METHOD FOR FORMING A FIBRE ARTICLE

(71) Applicant: McLaren Automotive Limited, Woking (GB)

(72) Inventor: Stephen Belcher, Surrey (GB)

(73) Assignee: McLaren Automotive Limited, Woking (GB)

( * ) Notice: Subject to any disclaimer, the term of this patent is extended or adjusted under 35 U.S.C. 154(b) by 287 days.

(21) Appl. No.: 17/632,188

(22) PCT Filed: Jul. 31, 2020

(86) PCT No.: PCT/GB2020/051846
§ 371 (c)(1),
(2) Date: Feb. 1, 2022

(87) PCT Pub. No.: WO2021/023979
PCT Pub. Date: Feb. 11, 2021

(65) Prior Publication Data
US 2022/0281184 A1    Sep. 8, 2022

(30) Foreign Application Priority Data

Aug. 2, 2019 (GB) ...................................... 1911076

(51) Int. Cl.
*B29C 70/44* (2006.01)
*B29C 35/02* (2006.01)
(Continued)

(52) U.S. Cl.
CPC .............. *B29C 70/44* (2013.01); *B29C 35/02* (2013.01); *B29C 70/54* (2013.01); *B29C 70/542* (2013.01); *B29L 2031/3055* (2013.01)

(58) Field of Classification Search
CPC .... B29C 70/44; B29C 70/542; B29C 35/0227
See application file for complete search history.

(56) References Cited

U.S. PATENT DOCUMENTS 5,108,532 A * 4/1992 Thein .................. B32B 37/1009
156/308.2
5,464,337 A * 11/1995 Bernardon ............ B29C 33/302
425/389

(Continued)

FOREIGN PATENT DOCUMENTS

AU        8086598     3/1999
AU         738958    10/2001
(Continued)

OTHER PUBLICATIONS

English machine translation of JP2004058349 (Year: 2024).*
(Continued)

*Primary Examiner* — Edmund H Lee
(74) *Attorney, Agent, or Firm* — Fish & Richardson P.C.

(57) ABSTRACT

A method for forming a fibre article, the method comprising: locating a fibre preform between a first diaphragm and a second diaphragm, the preform comprising a heat-activatable binder; drawing a vacuum between the first and second diaphragms so as to hold the preform captive between the diaphragms; positioning a first heater plate in contact with the first diaphragm; positioning a second heater plate in contact with the second diaphragm; drawing a vacuum between the first diaphragm and the first heater plate so as to increase the contact between the first diaphragm and the first heater plate; releasing the vacuum between the first diaphragm and the first heater plate; and drawing a vacuum between the second diaphragm and the second heater plate so as to increase the contact between the second diaphragm and the second heater plate.

20 Claims, 6 Drawing Sheets

(51) Int. Cl.
*B29C 70/54* (2006.01)
*B29L 31/30* (2006.01)

(56) References Cited

U.S. PATENT DOCUMENTS

| | | |
|---|---|---|
| 2011/0108667 A1 | 5/2011 | Keller et al. |
| 2021/0023799 A1* | 1/2021 | Santoni ................. B29C 70/542 |

FOREIGN PATENT DOCUMENTS

| | | | |
|---|---|---|---|
| DE | 202016104449 | | 8/2016 |
| GB | 2355958 | | 5/2001 |
| JP | 2004058349 | * | 2/2004 |
| KR | 20090016440 | * | 2/2009 |
| WO | WO 2007/043876 | | 4/2007 |
| WO | WO 2018/146178 | | 8/2018 |
| WO | WO 2019/186185 | | 10/2019 |

OTHER PUBLICATIONS

Office Action in Chinese Appln. No. 202080067008.3, mailed on Jan. 31, 2024, 19 pages (with English Translation).
International Search Report and Written Opinion in International Appln. No. PCT/GB2020/051846, dated Nov. 2, 2020, 15 pages.
Office Action in British Appln. No. 19911076.6, dated Jan. 29, 2020, 3 pages.
Office Action in British Appln. No. 19911076.6, dated Jul. 5, 2021, 3 pages.
Office Action in European Appln. No. 20751646.9, mailed on Jul. 31, 2024, 5 pages.

* cited by examiner

METHOD FOR FORMING A FIBRE ARTICLE

CROSS-REFERENCE TO RELATED APPLICATIONS

The present application is the national stage entry of International Patent Application No. PCT/GB2020/051846, filed on Jul. 31, 2020, and claims priority to Application No. GB1911076.6, filed in the United Kingdom on Aug. 2, 2019, the disclosures of which are incorporated herein by reference thereto.

FIELD OF THE INVENTION

This invention relates to a method of forming a fibre article including heating a fibre preform.

BACKGROUND

An increasing number of relatively large components are being made by moulding. Many of these are composite components, typically fibre-reinforced resin components made of systems such as carbon-fibre/epoxy. Some examples are tubs for automobiles, wings for aircraft, blades for wind turbines and masts for yachts.

One method of forming moulded components is diaphragm forming. In diaphragm forming, a flexible moulding blank which is to be shaped is positioned between an elastic diaphragm and a shaped, rigid mould tool. Then a vacuum is drawn between the diaphragm and the mould tool. This pulls the diaphragm into contact with the mould, and eventually causes the blank to be held in close conformity with the shape of the mould tool. Then the blank can be set in shape, for example by applying heat to the mould tool so as to cure a resin that is infused into the blank. Once the blank is set in shape the vacuum can be released and the blank can be removed. It is possible to position a diaphragm on either side of the mould blank, and to additionally draw a vacuum between the two diaphragms. This allows the blank to be laid up conveniently on top of the lower diaphragm.

Figure 1A:
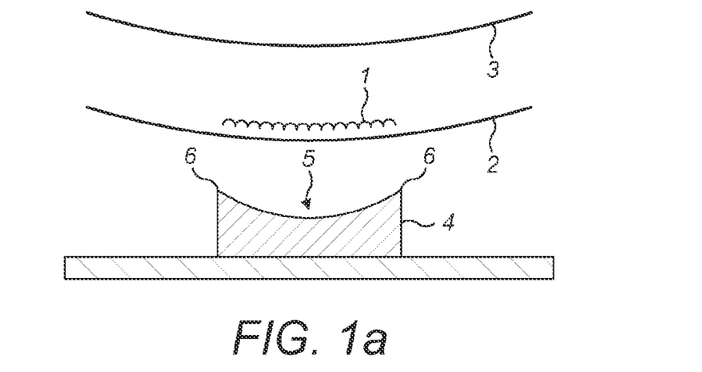
FIGS. 1a-c shows stages in a diaphragm forming process.
Figure 1B:
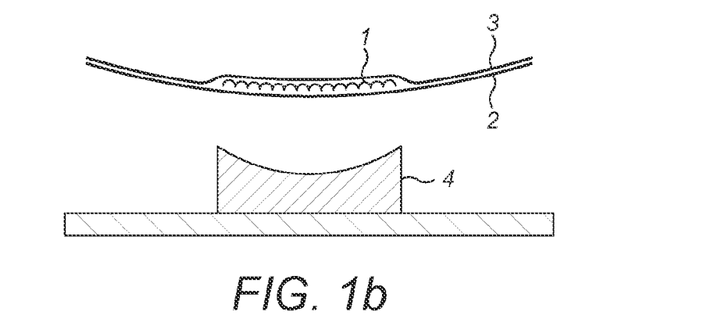
Figure 1C:
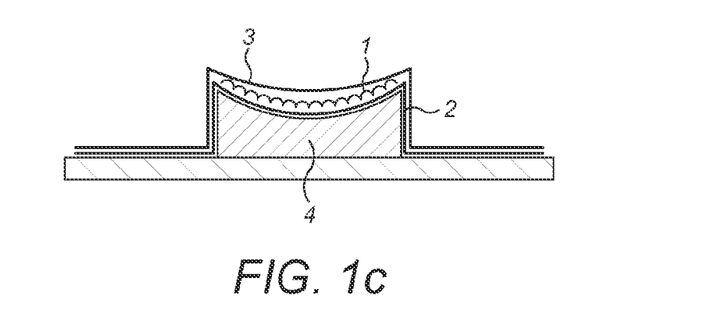

FIG. 1 shows steps in one type of diaphragm forming process. At FIG. 1a, a mat 1 of reinforcing fibres impregnated with a heat-activated adhesive is located between two diaphragms 2, 3. A shaped former 4 is located under the diaphragms. The mat 1 is positioned so that it is directly above the former. (See FIG. 1a). A vacuum is drawn between the diaphragms to consolidate the mat 1 and hold it tight between the diaphragms. (See FIG. 1b). Then a vacuum is drawn in the region between the lower diaphragm 3 and the former. This causes the diaphragms and hence the mat to conform to the former. (See FIG. 1c). The mat is heated to cause it to set in the shape of the former's surface. Then the vacuums can be released and the shaped mat removed. This process can be used to make fibre preforms for use in a subsequent resin transfer moulding step.

The mat can be heated whilst the mat is conformed to the former. Alternatively, the mat can be heated prior to being conformed to the former, the heat removed and then the diaphragms and hence the mat conformed to the former. In this case the mat is conformed to the former prior to the heat-activated adhesive setting and fixing the shape of the mat. The mat may be formed of a stack of laid up layers of reinforcing material.

The heating is usually applied using infrared lamps. These lamps can cause difficulties because of their high energy usage in producing the required levels of heat to activate the adhesive. They are also prone to overheating thin areas of the stacks and surface temperature is relatively uncontrolled. In addition, it is undesirable for there to be infrared radiation being emitted in the presence of operators of the forming machine and the very high surface temperature of the lamps can pose a burn risk to operators.

Therefore, it would be desirable to have an improved method of forming a fibre article using double diaphragm forming.

SUMMARY

According to a first aspect of the present invention there is provided a method for forming a fibre article, the method comprising: locating a fibre preform between a first diaphragm and a second diaphragm, the preform comprising a heat-activatable binder; drawing a vacuum between the first and second diaphragms so as to hold the preform captive between the diaphragms; positioning a first heater plate in contact with the first diaphragm; positioning a second heater plate in contact with the second diaphragm; drawing a vacuum between the first diaphragm and the first heater plate so as to increase the contact between the first diaphragm and the first heater plate; releasing the vacuum between the first diaphragm and the first heater plate; and drawing a vacuum between the second diaphragm and the second heater plate so as to increase the contact between the second diaphragm and the second heater plate.

The method may comprise releasing the vacuum between the second diaphragm and the second heater plate. The method may comprise positioning the first heater plate so that the first heater plate is not in contact with the first diaphragm. The method may comprise positioning the second heater plate so that the second heater plate is not in contact with the second diaphragm.

Positioning the first heater plate may comprise moving the first heater plate and/or the first diaphragm. Positioning the second heater plate may comprise moving the second heater plate and/or the second diaphragm. The method may comprise: providing a mechanism for moving the second heater plate laterally; performing the positioning of the second heater plate by laterally moving the second heater plate.

The contact between the first heater plate and the first diaphragm may cause heat transfer from the first heater plate to the fibre preform. Increasing the contact between the first diaphragm and the first heater plate may increase the heat transfer from the first heater plate to the fibre preform.

The contact between the second heater plate and the second diaphragm may cause heat transfer from the second heater plate to the fibre preform. Increasing the contact between the second diaphragm and the second heater plate may increase the heat transfer from the second heater plate to the fibre preform. The fibre preform may comprise multiple sheets of fibre material laminated into a stack. The or each sheet of fibre material may be a sheet of woven fibre material.

The fibre preform may have a variable thickness, and the positioning of the first and second heater plates in contact with the diaphragms may cause the first and second heater plates to contact those parts of the diaphragms adjacent thick parts of the fibre preform. Drawing a vacuum between the first diaphragm and the first heater plate may increase the contact between the first diaphragm and first heater plate in those parts of the diaphragm adjacent thin parts of the fibre preform. Drawing a vacuum between the second diaphragm and the second heater plate may increase the contact between the second diaphragm and second heater plate in those parts of the diaphragm adjacent thin parts of the fibre preform.

The method may comprise: mechanically displaying the diaphragms relative to the former so as to bring a part of the second diaphragm adjoining the preform into partial conformity with the former; drawing a vacuum between the second diaphragm and the former so as to increase the conformity between the said part of the second diaphragm and the former; and setting the preform in its configuration. The diaphragms may be elastic.

The preform may be part of a structural part of a vehicle. The preform may be part of a structural part of an automobile and the structural part is an automobile tub.

According to a first aspect of the present invention there is provided a double diaphragm forming apparatus comprising: a former having a contoured forming surface; a first diaphragm and a second diaphragm, the second diaphragm being offset from the forming surface; a first vacuum pump for drawing a vacuum between the first and second diaphragms so as to hold a preform captive between the diaphragms; a first heater plate and a second heater plate; a drive mechanism for mechanically displacing the diaphragms and the heater plates relative to each other so as to bring the first heater plate into contact with the first diaphragm and the second heater plate into contact with the second diaphragm; a second vacuum pump for drawing a vacuum between the first diaphragm and the first heater plate so as to increase the contact between the first diaphragm and the first heater plate; and a third vacuum pump for drawing a vacuum between the second diaphragm and the second heater plate so as to increase the contact between the second diaphragm and the second heater plate.

At least two of the first, second and third vacuum pumps may be a single vacuum pump.

BRIEF DESCRIPTION OF THE FIGURES

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for forming a fibre article. The method comprises locating a fibre preform between a first diaphragm and a second diaphragm, the preform comprising a heat-activatable binder, and drawing a vacuum between the first and second diaphragms so as to hold the preform captive between the diaphragms. The method further comprises positioning a first heater plate in contact with the first diaphragm, positioning a second heater plate in contact with the second diaphragm, and drawing a vacuum between the first diaphragm and the first heater plate so as to increase the contact between the first diaphragm and the first heater plate. The method further comprises releasing the vacuum between the first diaphragm and the first heater plate, and drawing a vacuum between the second diaphragm and the second heater plate so as to increase the contact between the second diaphragm and the second heater plate.

The present invention also relates to a double diaphragm forming apparatus comprising: a former having a contoured forming surface; a first diaphragm and a second diaphragm, the second diaphragm being offset from the forming surface. The forming apparatus also comprises a first vacuum pump for drawing a vacuum between the first and second diaphragms so as to hold a preform captive between the diaphragms; a first heater plate and a second heater plate; and a drive mechanism for mechanically displacing the diaphragms and the heater plates relative to each other so as to bring the first heater plate into contact with the first diaphragm and the second heater plate into contact with the second diaphragm. The forming apparatus also comprises a second vacuum pump for drawing a vacuum between the first diaphragm and the first heater plate so as to increase the contact between the first diaphragm and the first heater plate; and a third vacuum pump for drawing a vacuum between the second diaphragm and the second heater plate so as to increase the contact between the second diaphragm and the second heater plate.

Figure 2:
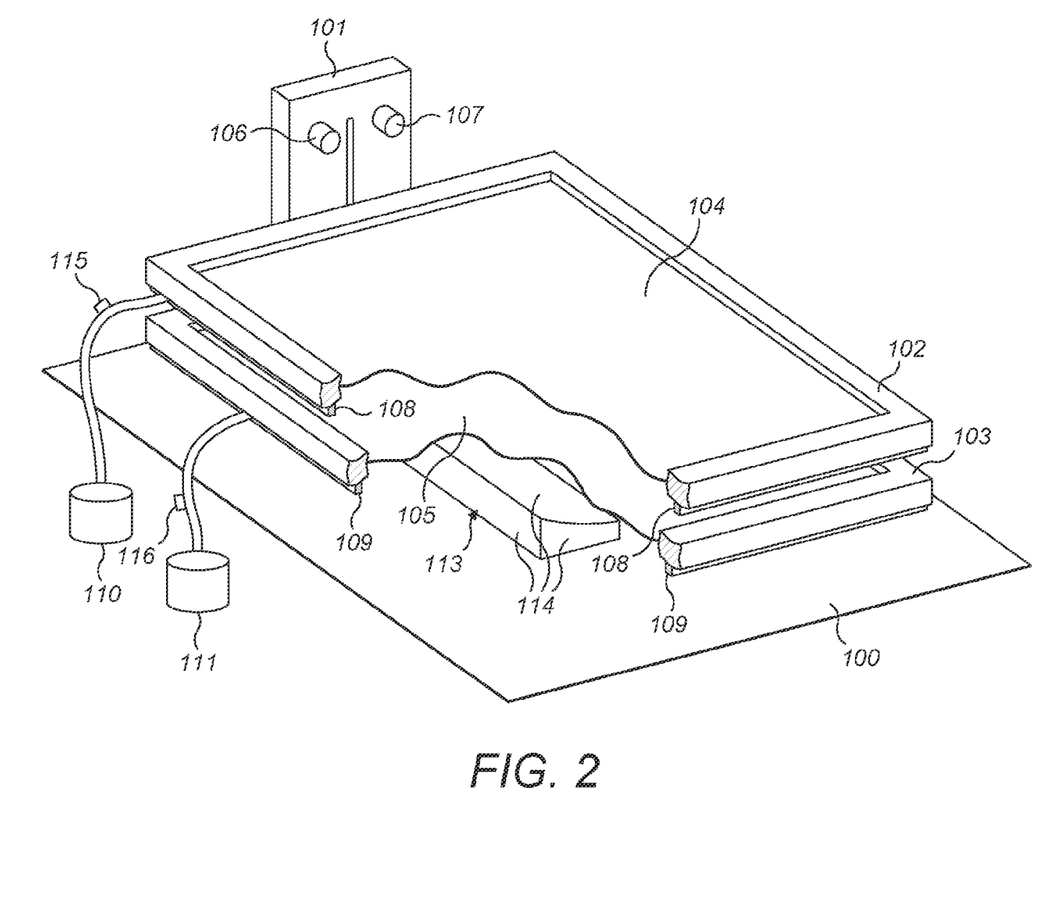
FIG. 2 shows a diaphragm forming apparatus.

FIG. 2 is a cut-away view of a diaphragm forming apparatus. The apparatus comprises a base 100. In this example the base is a horizontal generally flat surface, but it could be in any orientation and could be non-flat. A support tower 101 extends away from the base. FIG. 2 shows a single support tower but there could be multiple towers or support mechanisms of other forms as required for stability. The support tower 101 supports a pair of frames 102, 103. Each frame is a rigid structure defining an opening within it. The frames are generally planar and are arranged so that they are generally parallel to the base 100. Diaphragms 104, 105 are attached to respective ones of the frames so as to close the opening in the respective frame. Each diaphragm is attached in an air-tight way around its periphery to the respective frame. The diaphragms are formed of flexible and optionally elastic sheet material. The frames are mounted on the support tower 101 so that they can be moved towards and away from the base 100 by means of motors 106, 107. A seal 108 is provided on one or both of the frames so that when the frames are moved so as to abut each other the volume between the diaphragms can be sealed in an air-tight manner. A seal 109 is provided on frame 103 and/or on base 100 so that when frame 103 is moved so as to abut the base the volume between the base and the diaphragm 105 carried by frame 103 can be sealed in an air-tight manner. The seals could be located in any suitable way. A first vacuum pump 110 is coupled to one of the frames through an opening which, when the frames are abutting each other, gives access to the volume between the diaphragms. A second vacuum pump 111 is coupled to one of the frames or to the base through an opening which, when the frame 103 is abutting the base, gives access to the volume between diaphragm 105 and the base. A former 113 is located on the base.

A pair of heating plates 150, 151, not shown in FIG. 2 for clarity but shown in FIG. 5, may be supported by tower 101. A first heating plate 150 is provided that can contact the upper diaphragm 104. A second heating plate 151 is provided that can contact the lower diaphragm 105. The first heating plate 150 is moveable between a position in which it contacts the upper diaphragm 104 and a position where it does not contact the upper diaphragm 104. The second heating plate 151 is moveable between a position in which it contacts the lower diaphragm 105 and a position where it does not contact the lower diaphragm 105. The operation heating plates 150, 151 will be described further herein. A third vacuum pump 152 is coupled to the upper heating plate or to the frame 102 of the upper diaphragm 104 through an opening which, when the upper heating plate 150 is abutting the frame of the upper diaphragm 104, gives access to the volume between the upper heating plate 150 and the upper diaphragm 104. In the case that the second vacuum pump 111 is coupled to the frame of the lower diaphragm 105 then the opening in the frame is such that, when the frame 103 is abutting the second heating plate 151, the opening gives access to the volume between the lower heating plate 151 and the lower diaphragm 105. In the case that the second vacuum pump 11 is coupled to the base then a fourth vacuum pump may be present. This fourth vacuum pump may be coupled to the frame 103 of the lower heating plate 151 through the opening which, when the lower heating plate 151 is abutting the frame 103 of the lower diaphragm 105, gives access to the volume between the lower heating plate 151 and the lower diaphragm 105. In effect, the fourth vacuum pump is connected as the third vacuum pump is pictured as being connected in FIG. 5a. As shown variously in the figures, the heating plates may be flat on the side that faces the respective diaphragm or the heating plate may have a variable cross section so that parts of the side that faces the respective diaphragm are closer to the diaphragm than other parts when the heating plates are aligned with the diaphragms in the working direction 120. The heating plates may have a stepped profile as shown in FIGS. 5a to 5c so that the heating plates can contact sufficiently with the diaphragms.

The pair of heating plates 150, 151, may also be moved by respective motors in an analogous manner to the pair of frames 102, 103.

The pair of heating plates 150, 151, may produce heat by any suitable means. For instance, the heating plates 150, 151 may contain electrical conductors which heat the heating plates. Alternatively, or as well as, the pair of heating plates 150, 151 may produce heat by exchanging heat energy from heated water that flows through the heating plates. The temperature at which the plates are heated to may be controlled by a thermostat so that the set temperature of the plates can be adjusted.

The diaphragms are formed of a pliable sheet material. One or both of the diaphragms may be formed of an elastic material. The diaphragms may, for example, both be formed of elastomeric sheet, for example rubber or silicone sheet. The diaphragms may be of any suitable thickness, for example a thickness in the range from 0.25 to 5.0 mm. Each diaphragm may be held taut in its respective frame. Alternatively, each diaphragm may be held loosely in its frame. As a consequence, it may sag somewhat at the outset of the forming process.

The base or bed 100 is generally flat. Optionally, grooves may be provided in the bed or scrim may be laid across the bed to improve the drawing of a vacuum uniformly across the bed and the former. Pump 111 could draw its vacuum through orifices in the bed.

In operation, a precursor, which may be a mat of reinforcing material impregnated with a heat activated adhesive, can be placed between the diaphragms. The precursor may be a stack of layers of reinforcing material. Then the diaphragms can be moved together by using motor 106 and/or motor 107 to reposition one or both of the frames. Then a vacuum is drawn between the diaphragms by using pump 110. Then the diaphragms can be moved in unison by using motors 106 and 107 so as to bring frame 103 into a position where it abuts the base 100. The vacuum between the frames is maintained. This pushes diaphragm 105 into partial conformity with the exposed surface 114 of the former 113. The precursor is located at a region of the diaphragms such that it too is forced to take up the shape of the former. Because the preform is held to diaphragm 105 by diaphragm 104, the preform is also partially conformed to the exposed surface 114. Then a vacuum is drawn between diaphragm 105 and the base 100. This brings diaphragm 105 into full conformity with the exposed surface 114. At some point up to this stage the precursor has been heated by heating plates in order to activate the adhesive. Then the adhesive is permitted to set, fixing the precursor in a shape mimicking that of at least part of the exposed surface 114 of the former. Then the vacuums are released by activating valves 115, 116 in the supply lines from pumps 110, 111, the frames are moved apart and the part formed from the precursor is removed.

Figure 3:
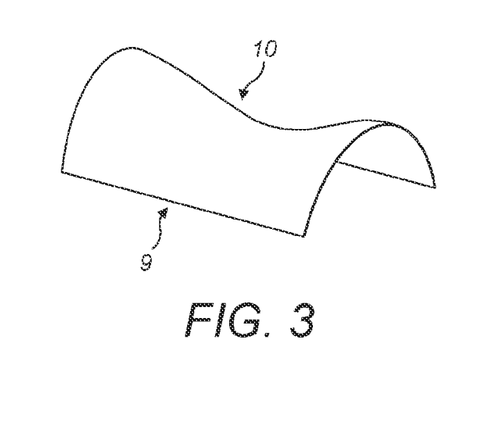
FIG. 3 shows a part to be formed.

FIG. 3 shows a part 9 that may be desired to be formed using this method. The part has a saddle region 10 which is concave upwards in the orientation of FIG. 3. The part may go on to form a structural part of a vehicle (e.g. an automobile tub, an aircraft wing or a boat hull) or a part for another purpose such as a blade for a wind turbine. Advantageously, the part forms part of a structural part of a high performance automobile.

Figure 4:
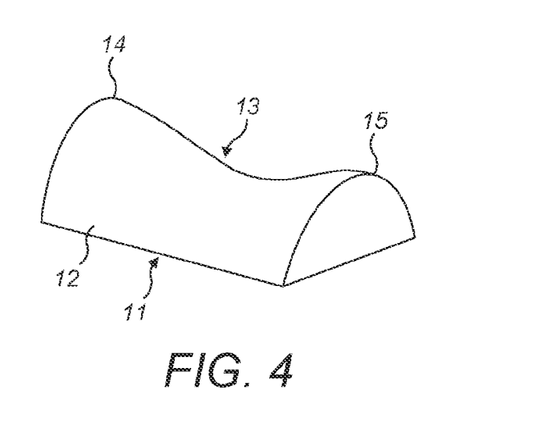
FIG. 4 shows a former for shaping the part of FIG. 3.

FIG. 4 shows a former or tool 11 suitable for forming the part of FIG. 3 in a diaphragm forming process. The former is a rigid block or shell having a forming surface 12. The forming surface has a shape that matches the desired shape of part 9. The forming surface has a saddle region 13 which is concave upwards in the orientation of FIG. 3 and is intended to shape the saddle region 10 of the part 9. On either side of the saddle region 13 of the former there are prominences 14, 15.

FIG. 5 shows stages in the forming of the part 9 by a double-diaphragm process, using the apparatus of FIG. 2.

In a first step (FIG. 5a) the two diaphragms 104, 105 are spaced apart from each other and from the former 113. Each diaphragm is suspended from a respective frame 102, 103. The operating direction 120 in which the frames can be moved is generally perpendicular to the diaphragms, and the former 113 is positioned on a bed 100 offset from the diaphragms in the operating direction. The former is located on the bed with its forming surface 114 facing the closer diaphragm 105. The prominences 14, 15 are both nearer to the closer diaphragm than is the hollow defined by the saddle region 13.

Figure 5A:
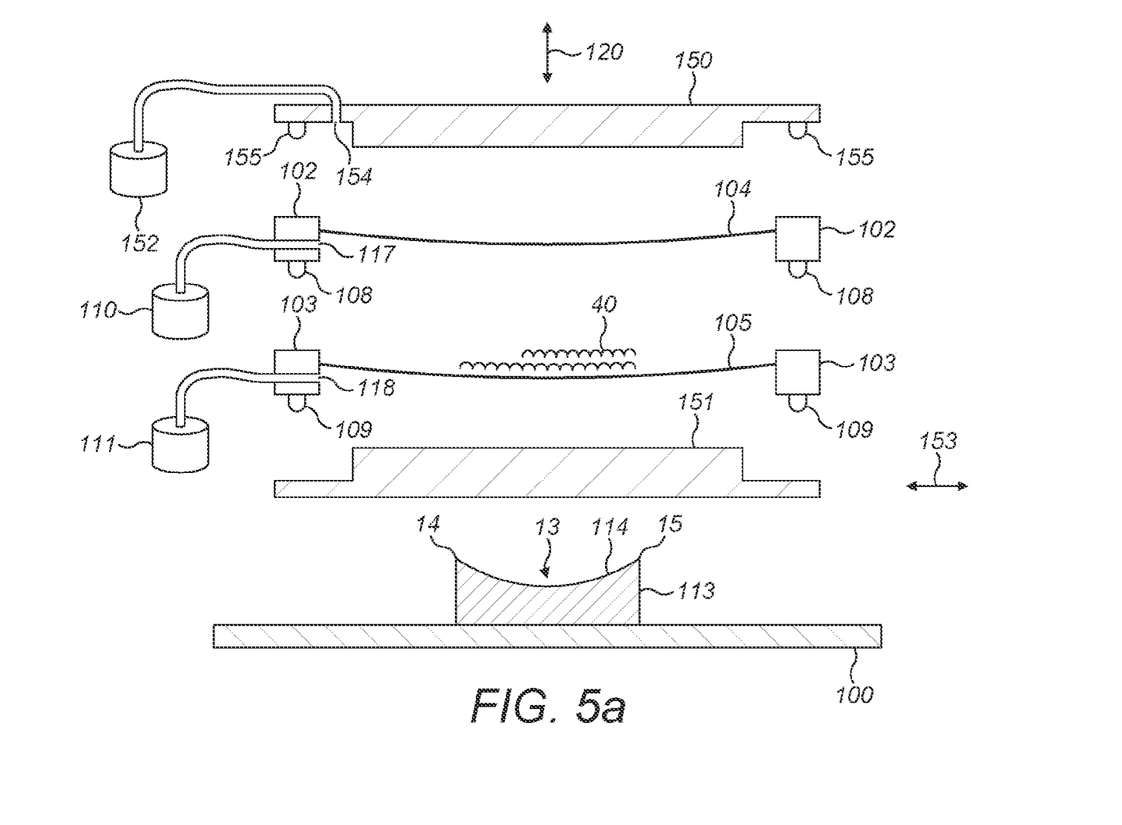
FIG. 5a-k shows, in cross-section, stages in a double-diaphragm process for shaping the part of FIG. 3.

As shown in FIG. 5a, precursor 40 is located between the diaphragms. The precursor is formed of sheet material. It may comprise one or more layers of material. One or more such layers may, for example, be of woven or knitted fabric. One or more such layers may, for example, be of loose or bundled fibres, for example runs of fibre or tow. One or more such layers may, for example, be non-fibrous material, for example biaxially uniform sheet. A fabric layer may comprise runs of reinforcing fibre which are interwoven, stitched or fused together. Such stitching may be by means of a secondary fibre material having a lower tensile strength per unit volume than the material of the reinforcing fibre. The stitching fibre may nevertheless be substantially inextensible. The reinforcing fibre may, for example, be carbon fibre, glass fibre or a polymer fibre such as an aramid fibre. Layers of loose or bundled fibres may comprise fibres of one or more such materials. As an example, the precursor may comprise multiple sheets of carbon fibre fabric or mat. Each of those sheets may comprise carbon fibre runs in multiple non-parallel directions. For example, the runs in a single sheet may be offset at 90°, 60° or 45° to each other. The sheets may be arranged one on top of the other so that the run directions in one sheet are offset from the or each run direction in the or each adjacent sheet. When the precursor comprises multiple sheets they may be tacked together by adhesive or by mechanical bonding elements such as staples, studs, clips or stitches to help retain them in alignment with each other. As shown in FIG. 5, some parts of the precursor may have a thickness that is greater than other parts of the precursor.

The precursor is pliable. This allows it to be forced to conform to the forming surface 114 of the former.

The precursor is configured so that it can be set in shape so as to adopt the shape of the forming surface. This may be done in any suitable way. For example, one or more layers of the precursor may comprise thermoplastic material. The precursor may then be heated by the pair of heating plates 150, 151, before contact with the former so as to raise the thermoplastic material above its softening temperature (e.g. for some materials the glass transition temperature), and then permitted to cool whilst in contact with the former so as to set the thermoplastic material in shape. Alternatively, one or more layers of the precursor may comprise a heat activated adhesive. The precursor may then be heated before contact with the former so as to cause the adhesive to set the precursor in shape. One convenient approach is for the precursor to comprise a layer of fabric comprising fibres, and for those fibres to be coated with a thermosetting adhesive. The precursor may comprise one or more sheets of dry fabric. The precursor may comprise a dry fibre binder which may be inherently tacky and may be heat-activatable (e.g. thermoplastic or thermosetting).

The precursor is located between the diaphragms at a location such that, when the diaphragms are moved to the former as will be described below, it will be located at the shaping surface 114. Consequently it can be pressed to the shape of the shaping surface 114.

If the diaphragms are generally horizontal then the precursor can be laid on the lower diaphragm, as shown in FIG. 5a. The precursor may be tacked to one of the diaphragms with a temporary adhesive. That may help hold it in place if the diaphragms are not horizontal.

In a preferred configuration, the precursor comprises multiple sheets which are coated at least partially with a binder which can help to hold them together in a stack. The binder could be in powder or liquid form, or in the form of an adhesive sheet. In the process of laying up the sheets, at last some of the sheets may be coated on at least one side with the binder. Then, when the sheets are laid up there can be binder between the sheets. Preferably, the binder is disposed on the sheets such that the binder does not come into contact with the diaphragms. This can avoid degradation of the diaphragms.

There is an outlet 117 through frame 102. Pump 110 is coupled to that outlet. Seal 108 can render the region between the diaphragms air-tight when the frames are positioned against each other, except for outlet 117. The seal 108 may, for example, be a rubber bead. Pump 110 could alternatively (or in addition) be coupled through frame 103 and/or could be attached to a connector in one of the diaphragms.

The upper heating plate 150 can be moved with a vertical component above the upper diaphragm 104. Because the upper heating plate 150 can move vertically (see 120), it can move to be in contact with the upper diaphragm when heating is needed to be applied to the precursor and move to not be in contact with the upper diaphragm 104 when heating is not needed to be applied to the precursor. The initial contact made between upper heating plate 150 and the upper diaphragm 104 may only be a partial contact between part of the upper heating plate 150 and the upper diaphragm 104. The lower heating plate 151 can be moved with a horizontal component (see 153) so as to be located between the lower diaphragm 105 and the mould tool 113. It can be removed before the moulding step. The lower diaphragm 105 can be lowered to be in contact with the lower heating plate 151 when heating is needed to be applied to the precursor and move to not be in contact with the lower diaphragm 105 when heating is not needed to be applied to the precursor. Alternatively, or as well as, the lower heating plate 151 may also be configured to move with a vertical component (see 120) so as to move into and out of contact with the lower diaphragm 105.

Figure 5B:
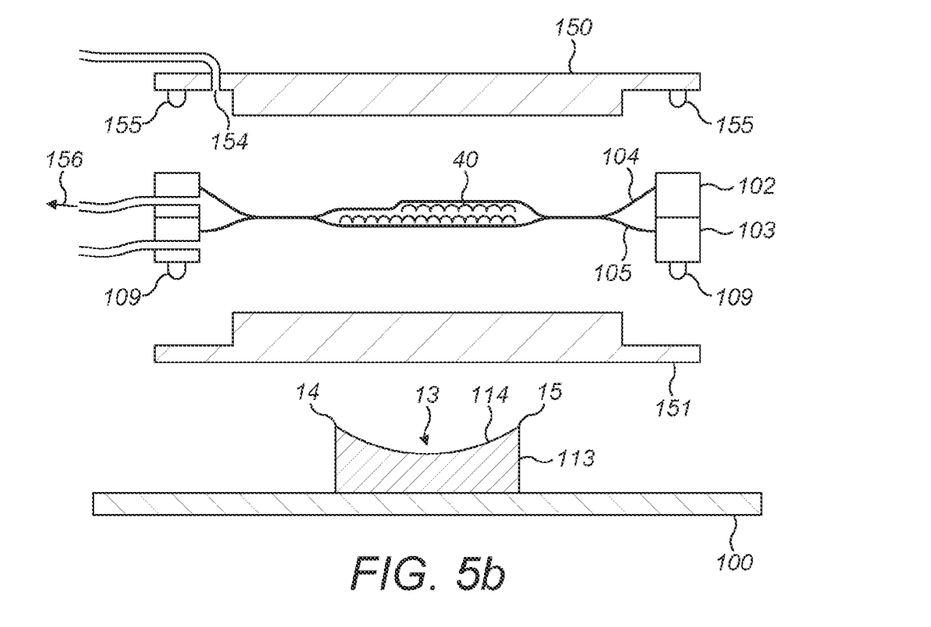

As shown in FIG. 5b, in the next step of the process the diaphragms 104, 105 are brought together by moving at least one of the frames so as to bring the frames into sealing engagement. Then a vacuum is drawn (as shown by arrow 156) between the diaphragms by means of pump 110. This pulls the diaphragms together and holds the precursor securely captive between the diaphragms.

There is an outlet 118 through frame 103. Pump 111 is coupled to that outlet. Seal 109 can render the region between the closer diaphragm 105 and the bed 100 air-tight when the closer frame 103 is positioned against the bed, except for outlet 118. The seal 109 may, for example, be a rubber bead. Seal 109 can also render the region between the closer diaphragm 105 and the lower heating plate 151 air-tight when the closer frame 103 is positioned against eh lower heating plate 151.

There is an outlet 154 through heating plate 150. Pump 152 is coupled to that outlet. A seal is powered on the upper heating plate 150 so that when the upper heating plate 150 and the upper frame 102 are moved so as to abut each other the volume between the upper diaphragm and the upper heating plate 150 can be sealed in an air-tight manner.

The method by which heat is applied to the precursor encapsulated between the diaphragms will now be described with reference to FIGS. 5c to 5f. Heat is applied to the diaphragms via heating plates. Heat is transferred through the diaphragms to the precursor. This can activate the binder of the precursor. Typically, the binder may become active in the region of from 70 to 120° C. Preferably the precursor is heated to between 70° C. and 150° C. Preferably the precursor is heated such as to activate the binder. The profile of the precursor can effect the ability of the, predominantly flat, heating plates to heat the precursor which can represent a bottleneck in some processes. This is because the heating plates can only contact with some of the diaphragm, and so transfer heat directly to only some of the precursor.

Figure 5C:
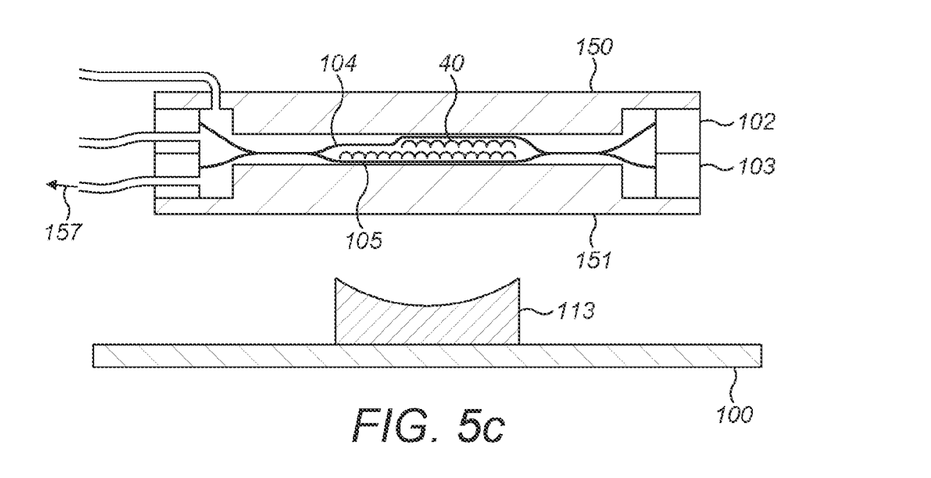

As shown in FIG. 5c, in the next step of the process, the first heating plate 150 is brought into contact with the upper diaphragm 104 and the second heating plate 151 is brought into contact with the lower diaphragm 105. As described herein, the upper heating plate 150 and/or the upper diaphragm 104 may be moved in the operation direction 120 so that the first heating plate is brought into contact with the upper diaphragm 104. The lower heating plate 151 and/or the lower diaphragm 105 may be moved in the operation direction so that the first heating plate 150 is brought into contact with the lower diaphragm 105. The frame of the upper diaphragm 102 has a sealing engagement with the upper heating plate 150 when the upper heating plate 150 is in contact with the upper diaphragm 104. The frame of the lower diaphragm 103 has a sealing engagement with the lower heating plate 151 when the lower heating plate 151 is in contact with the lower diaphragm 105. The precursor in FIG. 5c has a variable thickness. The thickness of the precursor being the dimension of the precursor running between the two diaphragms 104, 105. Bringing the first and second heating plates into contact with the diaphragms 104, 105 means that the first and second heating plates contact the diaphragms in regions adjacent where the precursor is thickest. There may be some contact between the first and second heating plates and the diaphragms in regions adjacent where the precursor is thinner. However, this contact is between one of the first and second heating plates and the respective diaphragm rather than both.

Figure 5D:
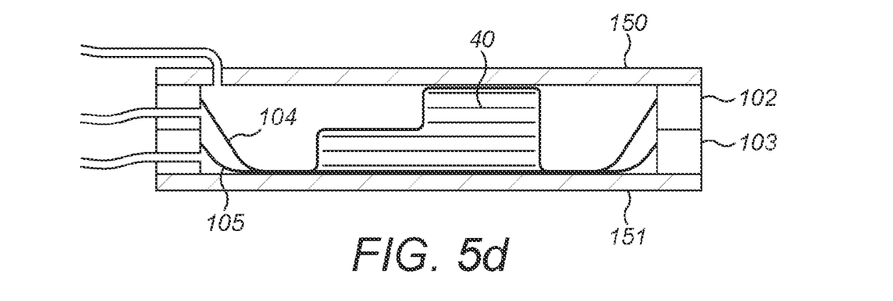

As shown in FIG. 5d, a vacuum is drawn (as shown by arrow 157) between the lower diaphragm 105 and the lower heating plate 151. This pulls the lower diaphragm 105 towards the lower heating plate 151 thus increasing the contact between the lower diaphragm 105 and the lower heating plate 151. This brings as much of the precursor, via the diaphragm, into contact with the lower heating plate 151 as possible which increases the rate at which the precursor can be heated by the lower heating plate 151. As shown in FIG. 5d, the precursor has a variable thickness. The vacuum causes the parts of the lower diaphragm 105 that are adjacent the parts of the precursor that are thinner to be pulled into contact with the lower heating plate. This permits heat to flow to those thinner parts.

Figure 5E:
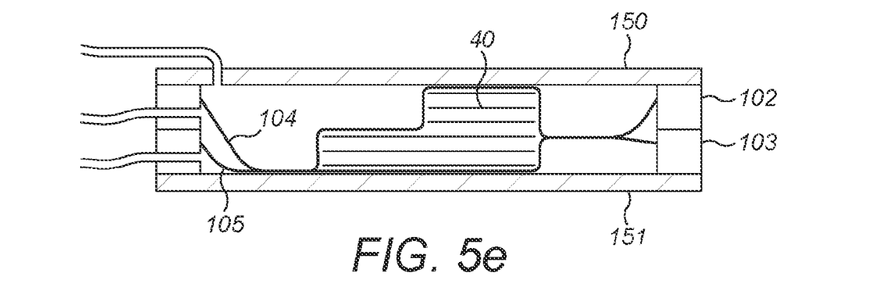

After a predefined time period, the vacuum between the lower diaphragm 105 and the lower heating plate 151 is released. This is as shown in FIG. 5e where the lower diaphragm 105 is shown as not being pulled tight against the lower heating plate 151. The predefined time period may be half of the time period needed to heat the precursor to a temperature sufficient to activate or soften the binder within the precursor. The time period may be referred to as the cycle time.

Figure 5F:
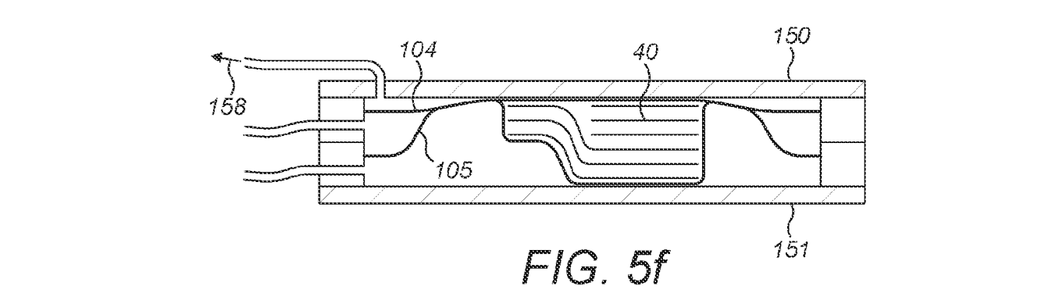
Figure 5G:
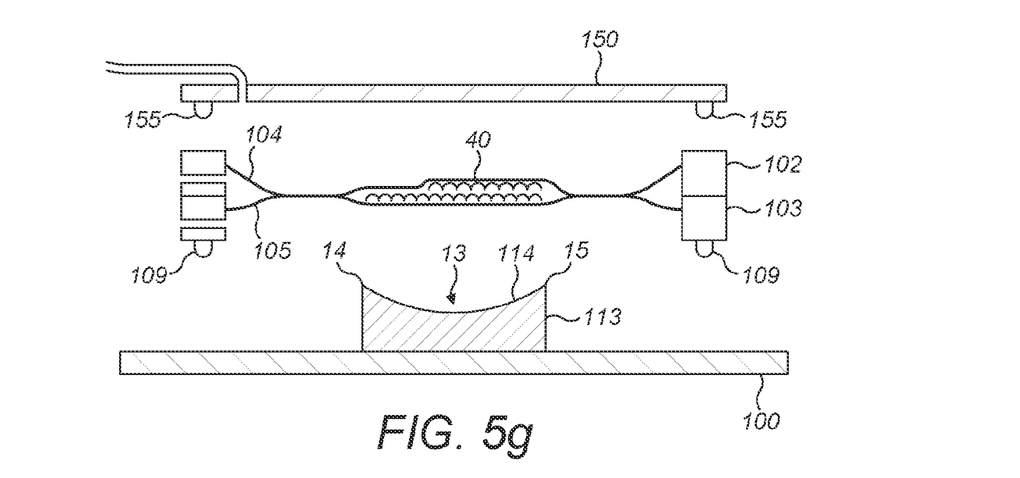
Figure 5H:
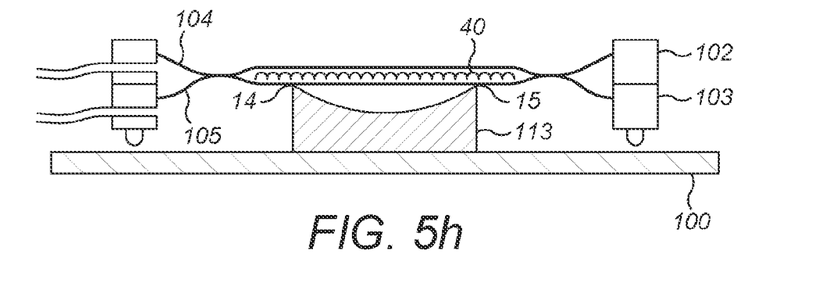

As shown in FIG. 5f, in the next step in the process, a vacuum is drawn (as shown by arrow 158) between the upper diaphragm 104 and the upper heating plate 150. This pulls the upper diaphragm 104 towards the upper heating plate 150 thus increasing the contact between the upper diaphragm 104 and the upper heating plate 150. This brings as much of the precursor, via the diaphragm, into contact with the upper heating plate 150 as possible which increases the rate at which the precursor can be heated by the upper heating plate 150. As discussed in relation to FIG. 5d, the precursor has a variable thickness. The vacuum causes the parts of the upper diaphragm 104 that are adjacent the parts of the precursor that are thinner to be pulled into contact with the upper heating plate. By switching between forcing the precursor against the lower heating plate 151 and the upper heating plate 150 both sides of the precursor are heated equally.

After a predefined time period, the vacuum between the upper diaphragm 104 and the upper heating plate 150 is released. This is again as shown in FIG. 5e.

It should be noted that in the heating process described herein it has been found that heating using heating plates rather than IR heaters is faster for a given energy input. However, flat heating plats do not allow for full double-sided thermal contact required for maximum efficiency and lowest cycle times. This can result in a slower heating time in regions that have less than the full thickness of the precursor. However, it has been found that by switching the vacuum between the upper and lower heating plates the cycle time can be decreased so that those areas that are less thick, and thus only heated directly by one plate at a time, can be heated as quickly as those areas with a full thickness that are in direct contact with both heating plates. In addition, the temperature of the heating plates can be controlled accurately and within a tight tolerance. Therefore, by setting them to the upper allowable temperature for the precursor effectively guarantees that the precursor is never overheated regardless of their thickness at any given point.

The upper and lower heating plates 150, 151 can be moved so that they are no longer in contact with the diaphragms 104, 105. The lower heating plate 151 may be moved so that it is no longer located between the closer diaphragm 105 and the mould tool 113. This results in the configuration shown in FIG. 5g. The precursor can then be brought into partial or full conformity with the mould surface. A measure having the effect of cooling the precursor may be commenced after the precursor is fully in conformity with the mould. That may, for example, be forcing air to move past the precursor.

As discussed with reference to FIG. 5b, a vacuum is drawn between the two diaphragms to hold the precursor securely captive between the diaphragms. In one convenient process, a first level of vacuum is drawn between the diaphragms whilst the precursor is being heated. Once the precursor has reached a predetermined temperature and/or state, e.g. with the binder activated, the heating can be stopped. Then a second, greater level of vacuum can be drawn. The second level of vacuum may, for example, be approximately 1 Bar below ambient pressure. The second level of vacuum may be drawn with the lower diaphragm in contact with the mould, as described further below. A lower heater 201 is withdrawn from the space between the lower diaphragm and the mould before the lower diaphragm is moved into contact with the mould.

Figure 5I:
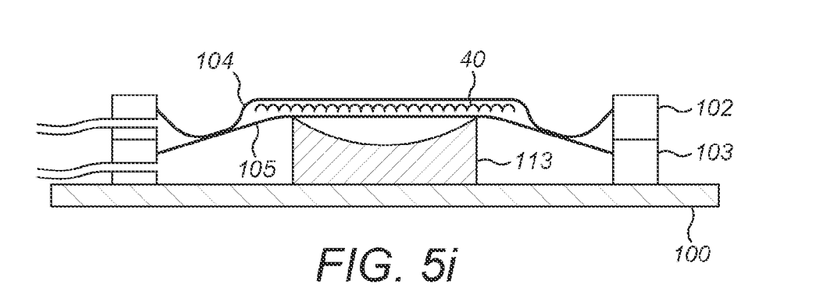

The frames 102, 103 are moved so as to bring the closer diaphragm 105 into contact with the forming surface 114. In this example, the mould surface has a concavity in at least one axis, as represented by the saddle. However, the mould surface could be flat or fully convex. In this example, the lower diaphragm 105 first contacts the prominences 14, 15. (See FIG. 5h). Then, as shown in FIG. 5i, the frames are moved so that the closer frame 103 to the bed is brought into sealing engagement with the bed. At this stage, although the periphery of the closer diaphragm 105 is closer to the bed in the operating direction 120 than is the deepest part of the saddle 13 of the forming surface 114, the closer diaphragm 105 is held away from the deepest part of the saddle by the prominences 14, 15. The frames may be moved by any suitable mechanism. For example, they may be driven to move by hydraulic actuators or electric motors to move. Guideways may be provided to guide the motion of the frames.

Figure 5J:
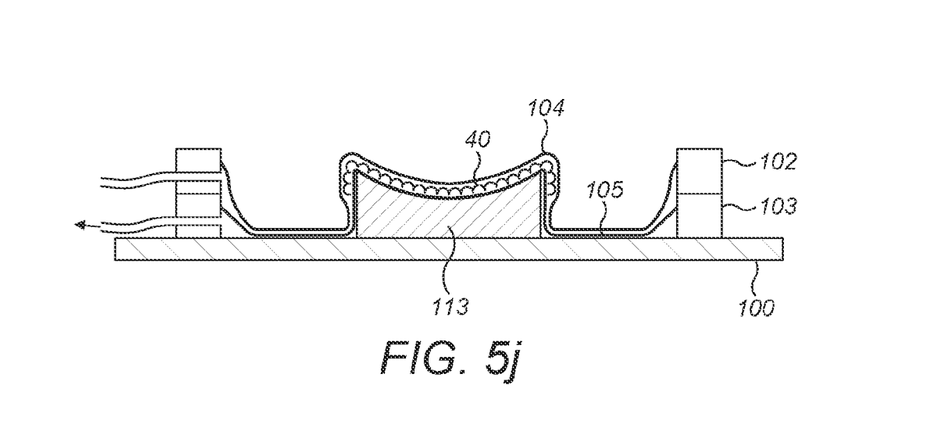
Figure 5K:
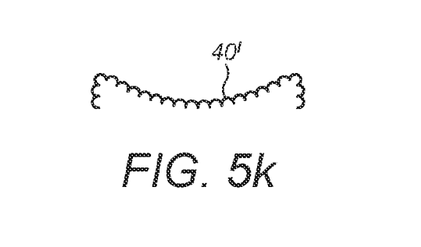

Next, using pump 111 a vacuum is drawn between the bed 100 and the closer diaphragm 105. (FIG. 5j). This pulls the closer diaphragm 105 into conformant uniform contact with the forming surface 114. The precursor 40 has been positioned so that it is adjacent to the region of the closer diaphragm 105 that is in contact with the forming surface 114. Because the precursor is held to the closer diaphragm by the vacuum between the two diaphragms, the precursor is also held in conformity with the shape of the forming surface 114. In the case of a concave or flat mould, this step may be omitted.

The precursor is then set in shape by appropriate means. For example, if the precursor is thermoplastic and has previously been heated then it is permitted to cool. Fans may be arranged to play on the upper and/or lower diaphragm whilst the precursor is cooling. This can increase the rate of cooling.

Once the precursor has been set in shape the vacuums are released, the frames returned to the position shown in FIG. 5a and the set body is removed from the apparatus as shown at 40' in FIG. 5f.

Each diaphragm may be of uniform or non-uniform thickness. If the diaphragm is of non-uniform thickness, the effective thickness of the diaphragm may be taken to be its mean thickness.

The diaphragms may be of the same or different compositions. It is preferred that both diaphragms are elastically extensible. Both diaphragms may be elastomeric sheets, for example rubber or silicone sheets. Both diaphragms may be of material having a Young's modulus less than, for example, 10 MPa or less than 6 MPa or less than 3 MPa.

The or each vacuum may be drawn to an absolute pressure of, for example, 200 mb or less, or 100 mb or less, or 50 mb or less. The diaphragm closer to the former may be more elastic than the other diaphragm: i.e. it may be deformed more for a given load.

The apparatus of FIG. 2 may be installed in any orientation. For example, the operating direction 120 could be vertical, horizontal or inclined. The former 113 could be below, above or offset horizontally from the diaphragms.

In the example of FIG. 5, the closer diaphragm is first moved into contact with the former by motion of the frames. Then it is drawn into full conformity with the former by drawing a vacuum between it and the former. In another example, the volume between the closer diaphragm and the bed 100 may be airtight even when the closer diaphragm is spaced from the former 113. This may be achieved by the presence of airtight walls extending from the bed to frame 103 when frame 103 is in the position shown in FIG. 5b. Then the closer diaphragm may be pulled into contact with the former by drawing a vacuum in that volume.

In the process described above, the mould body is located under the lower diaphragm and the lower diaphragm is moved into contact with the mould body. This methodology may be varied in several ways. In one variant, the mould body could be moved upwards to contact the lower diaphragm and press the precursor into shape. In another variant, the mould body could be located above the upper diaphragm. Then, once the precursor has been loaded and optionally a vacuum has been drawn between the diaphragms, the precursor can be brought into conformity with the mould surface by moving the diaphragms upwards and/or moving the mould body downwards.

Once the precursor has been set in shape as described above, it can be used in a subsequent forming process. For example, it can be located in a mould, impregnated with resin and the resin cured. The fibres of the precursor can then reinforce the resin. The subsequent forming process may be a resin transfer moulding process. The resin may be impregnated into the shaped precursor under a vacuum. In the case that the precursor is intended to go on to form a structural part of a vehicle (e.g. an automobile tub, an aircraft wing or a boat hull) or a part for another purpose such as a blade for a wind turbine, the structural part of the vehicle may be formed when the resin is impregnated into the shaped precursor. Advantageously, the structural part of a high performance automobile is formed when the resin is impregnated into the shaped precursor.

A single vacuum pump could be provided, and it could be connected by a valve to any or all of outlets 117, 118 and 154.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for forming a fibre article, the method comprising:
    locating a fibre preform between a first diaphragm and a second diaphragm, the preform comprising a heat-activatable binder;
    drawing a vacuum between the first and second diaphragms so as to hold the preform captive between the diaphragms;
    positioning a first heater plate in contact with the first diaphragm whilst the preform is held captive between the diaphragms;
    positioning a second heater plate in contact with the second diaphragm whilst the preform is held captive between the diaphragms;
    whilst the first heater plate is in contact with the first diaphragm and the second heater plate is in contact with the second diaphragm, drawing a vacuum between the first diaphragm and the first heater plate so as to increase the contact between the first diaphragm and the first heater plate;
    whilst the first heater plate is in contact with the first diaphragm and the second heater plate is in contact with the second diaphragm, releasing the vacuum between the first diaphragm and the first heater plate; and
    whilst the first heater plate is in contact with the first diaphragm and the second heater plate is in contact with the second diaphragm, drawing a vacuum between the second diaphragm and the second heater plate so as to increase the contact between the second diaphragm and the second heater plate.

2. A method according to claim 1, the method comprising releasing the vacuum between the second diaphragm and the second heater plate.

3. A method according to claim 2, the method comprising positioning the first heater plate so that the first heater plate is not in contact with the first diaphragm.

4. A method according to claim 2, the method comprising positioning the second heater plate so that the second heater plate is not in contact with the second diaphragm.

5. A method according to claim 1, wherein positioning the first heater plate comprises moving the first heater plate and/or the first diaphragm.

6. A method according to claim 1, wherein positioning the second heater plate comprises moving the second heater plate and/or the second diaphragm.

7. A method according to claim 1, the method comprising:
provided a mechanism for moving the second heater plate laterally; and
performing the positioning of the second heater plate by laterally moving the second heater plate.

8. A method according to claim 1, wherein the contact between the first heater plate and the first diaphragm causes heat transfer from the first heater plate to the fibre preform.

9. A method according to claim 8, wherein increasing the contact between the first diaphragm and the first heater plate increases the heat transfer from the first heater plate to the fibre preform.

10. A method according to claim 1, wherein the contact between the second heater plate and the second diaphragm causes heat transfer from the second heater plate to the fibre preform.

11. A method according to claim 10, wherein increasing the contact between the second diaphragm and the second heater plate increases the heat transfer from the second heater plate to the fibre preform.

12. A method as claimed in claim 1, wherein the fibre preform comprises multiple sheets of fibre material laminated into a stack.

13. A method as claimed in claim 12, wherein the or each sheet of fibre material is a sheet of woven fibre material.

14. A method as claimed in claim 1, wherein the fibre preform has a variable thickness, and the positioning of the first and second heater plates in contact with the diaphragms causes the first and second heater plates to contact those parts of the diaphragms adjacent thick parts of the fibre preform.

15. A method as claimed in claim 14, wherein drawing a vacuum between the first diaphragm and the first heater plate increases the contact between the first diaphragm and first heater plate in those parts of the diaphragm adjacent thin parts of the fibre preform.

16. A method as claimed in claim 14, wherein drawing a vacuum between the second diaphragm and the second heater plate increases the contact between the second diaphragm and second heater plate in those parts of the diaphragm adjacent thin parts of the fibre preform.

17. A method as claimed in claim 1, the method comprising:
mechanically displaying the diaphragms relative to a former so as to bring a part of the second diaphragm adjoining the preform into partial conformity with the former;
drawing a vacuum between the second diaphragm and the former so as to increase the conformity between the said part of the second diaphragm and the former; and
setting the preform in its configuration.

18. A method as claimed in claim 1, wherein the diaphragms are elastic.

19. A method as claimed in claim 1, wherein the preform is part of a structural part of a vehicle.

20. A method as claimed in claim 19, wherein the preform is part of a structural part of an automobile and the structural part is an automobile tub.

* * * * *